March 20, 1945.   O. A. SCHMITT   2,371,926
CAN BODY FEED TIMING MECHANISM
Filed Sept. 9, 1941   4 Sheets-Sheet 4
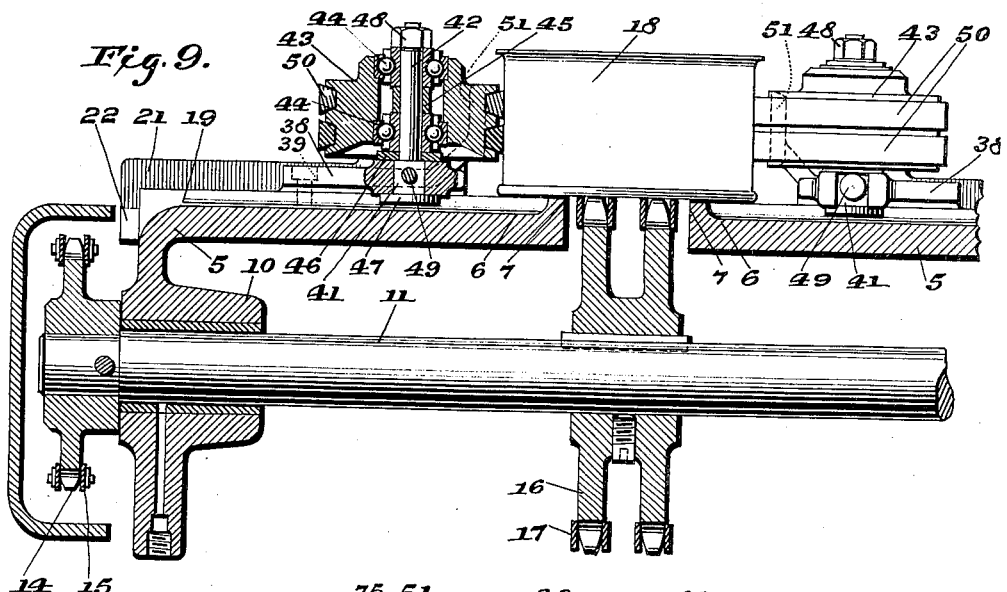
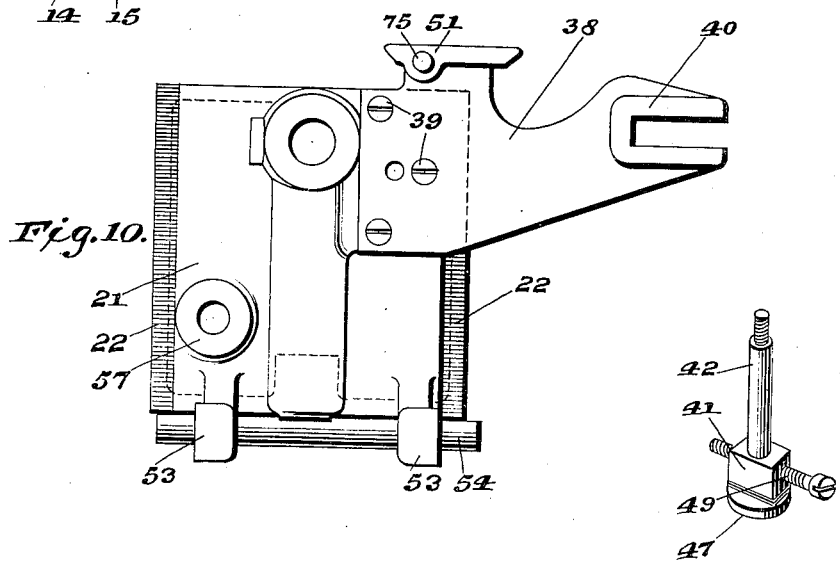
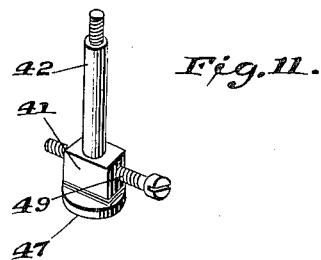
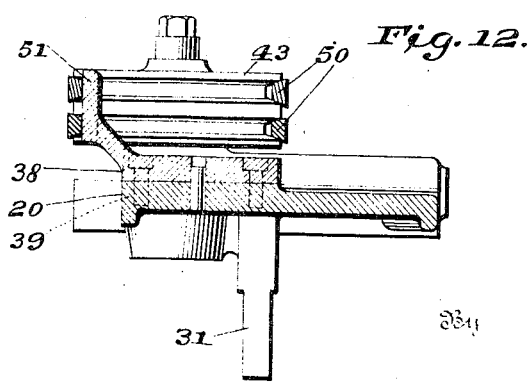
Inventor
Otto A. Schmitt
Mason T. Porter Patented Mar. 20, 1945

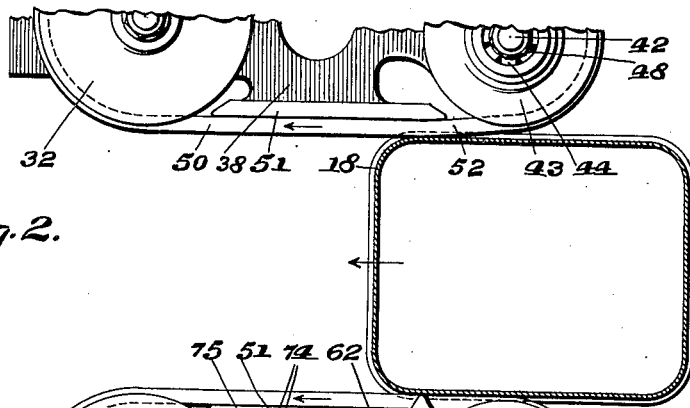
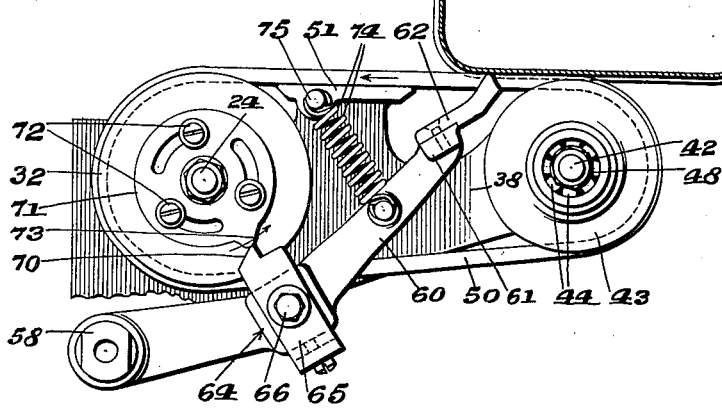
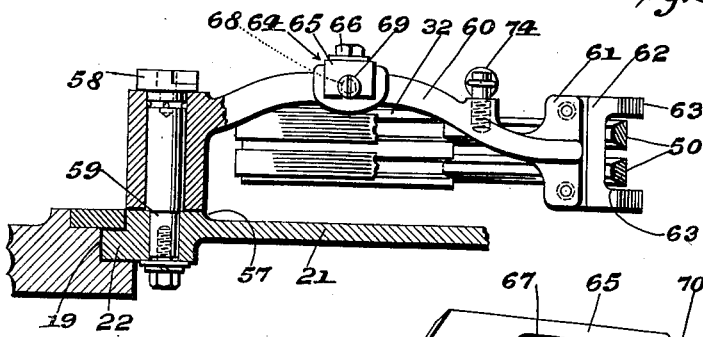
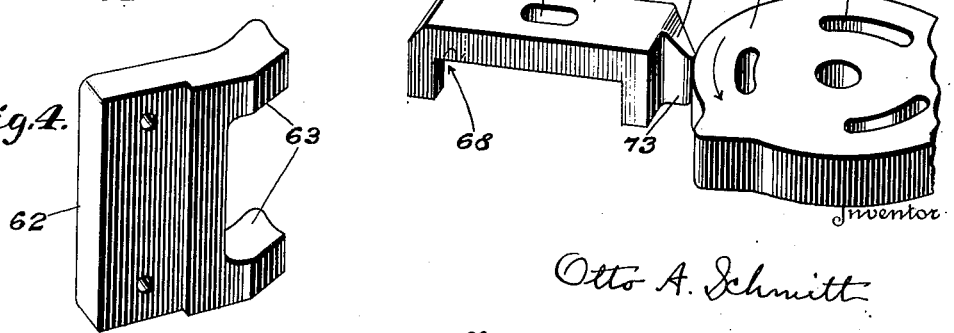

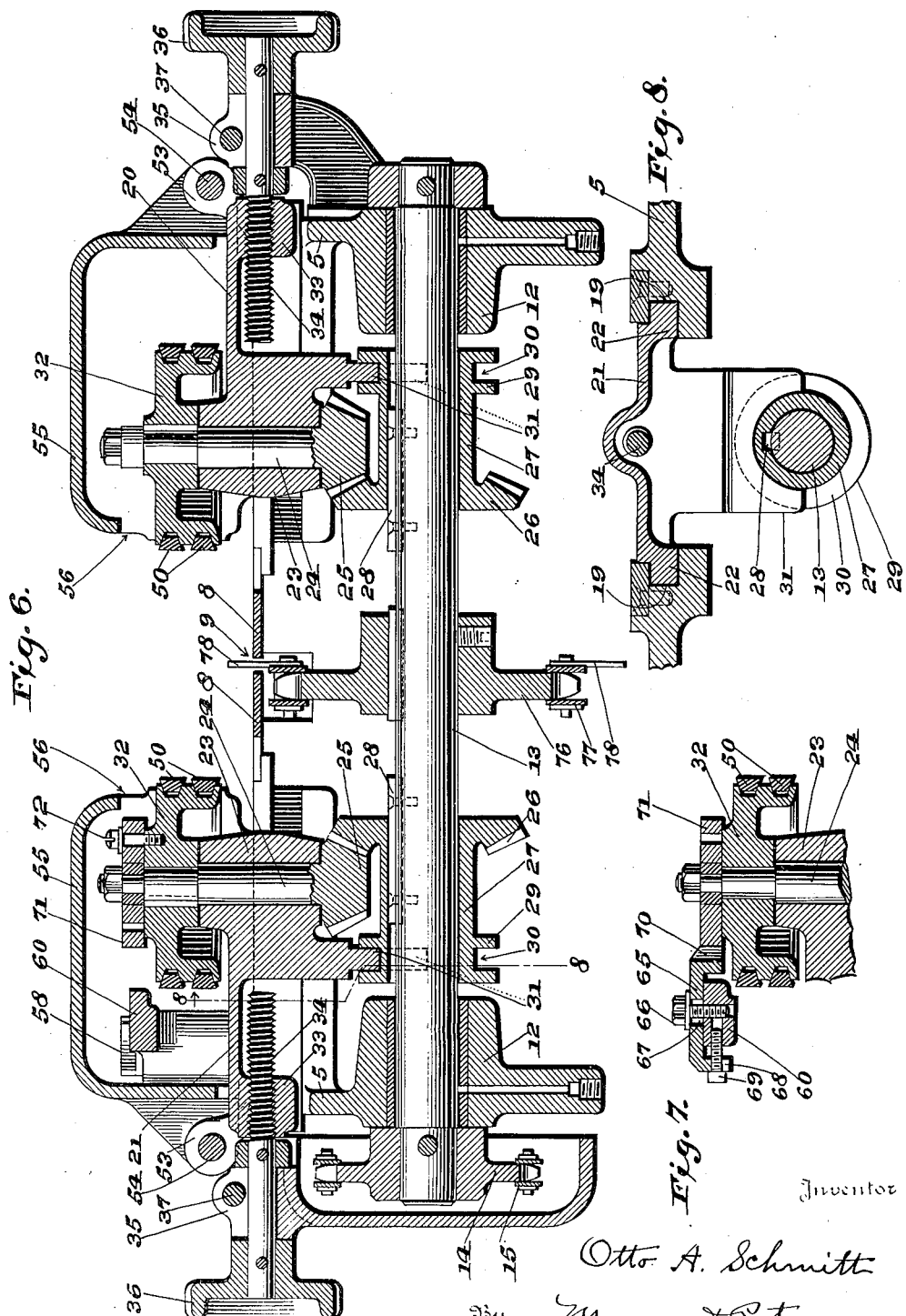

2,371,926

UNITED STATES PATENT OFFICE 2,371,926

CAN BODY FEED TIMING MECHANISM

Otto A. Schmitt, Syracuse, N. Y., assignor to Continental Can Company, Inc., New York, N. Y., a corporation of New York Application September 9, 1941, Serial No. 410,197

14 Claims. (Cl. 198—34)

The invention relates generally to work feeders, and more specifically to mechanism for feeding can bodies into machines in which work is performed thereon, and it primarily seeks to provide novel means for timing and controlling the feeding of the can bodies into the machine one-by-one in suitably timed and spaced relation. The invention is applicable to various forms of machines such as can body assembling or forming machines, can body filling machines, or can body closing machines.

In its more detailed nature, the invention resides in providing a conveyor for feeding cans at random or in end abutting relation in line toward the machine being served, a conveyor having properly spaced conveying lugs thereon for conveying the can bodies in suitably timed and spaced relation into the machine, opposed feeder belts for feeding the can bodies from the first mentioned conveyor to the spaced lug equipped conveyor, a swingably mounted can body intercepting finger, and cam means for controlling the position of the finger to alternately intercept the line of containers moving on the first mentioned conveyor and release cans one-by-one from said line to be engaged and moved by said belts.

Another object of the invention is to provide a can feed timing or controlling equipment of the character stated in which the finger is displaced from its can line intercepting position by cam action and is returned to its intercepting position by spring action in a manner for causing the finger to engage and slide along the can body just released prior to its intercepting engagement with the next succeeding can in the line, thereby to render the finger effective for controlling the feeding of can bodies of various lengths without alteration or adjustment of the equipment.

Another object of the invention is to provide a feed timing equipment of the character stated in which the opposed belts are mounted in a novel manner providing a slight offsetting of at least one of the belts effective to grip and feed the can bodies in a particularly efficient manner.

Another object of the invention is to provide a feed timing equipment of the character stated in which is included novel means for adjusting the position of the can body intercepting finger and the timing of the actuator cam associated therewith.

Another object of the invention is to provide in a feed timing mechanism of the character stated, a novel form of can body intercepting finger formed and positioned in a novel manner for straddling the adjacent feed belt equipment.

Another object of the invention is to provide novel mountings for the opposed feed belt equipments and their driving connections, said mountings being adjustable so as to enable adjustment of the spacing of the belts so as to readily adapt the mechanism for the feeding of can bodies of various widths.

Another object of the invention is to provide a feed timing equipment of the character stated in which the can body intercepting finger and its actuating cam are mounted as a unit with one of the feed belt assemblies so as to be bodily adjustable therewith.

With the above and other objects in view which will more fully appear, the nature of the invention will be more clearly understood by following the description, the appended claims, and the several views illustrated in the accompanying drawings.

In the drawings—

Figure 2 is a somewhat diagrammatic plan view illustrating the can body intercepting finger displaced from its effective or can body intercepting position and in sliding contact with the side wall of a can body being fed by the opposed belts.

Figure 3 is a detail vertical cross section taken on the line 3—3 on Figure 1.

Figure 4 is a detail perspective view of the fork shaped, removably mounted intercepting finger extremity.

Figure 5 is a detail perspective view illustrating a fragment of the interceptor finger displacing or actuator cam and the interceptor finger tappet member engaged thereby.

Figure 6 is a vertical cross section taken on the line 6—6 on Figure 1.

Figure 7 is a fragmentary vertical cross section taken on the line 7—7 on Figure 1.

Figure 8 is a fragmentary vertical cross section taken on the line 8—8 on Figure 6.

Figure 9 is a fragmentary vertical cross section taken on the line 99 on Figure 1.

Figure 10 is a detail plan view of the belt assembly supporting slide upon which the interceptor finger is mounted.

Figure 11 is a detail perspective view of one of the idler pulley supporting spindles.

Figure 12 is a fragmentary vertical cross section taken on the line 12—12 on Figure 1.

Figure 1:
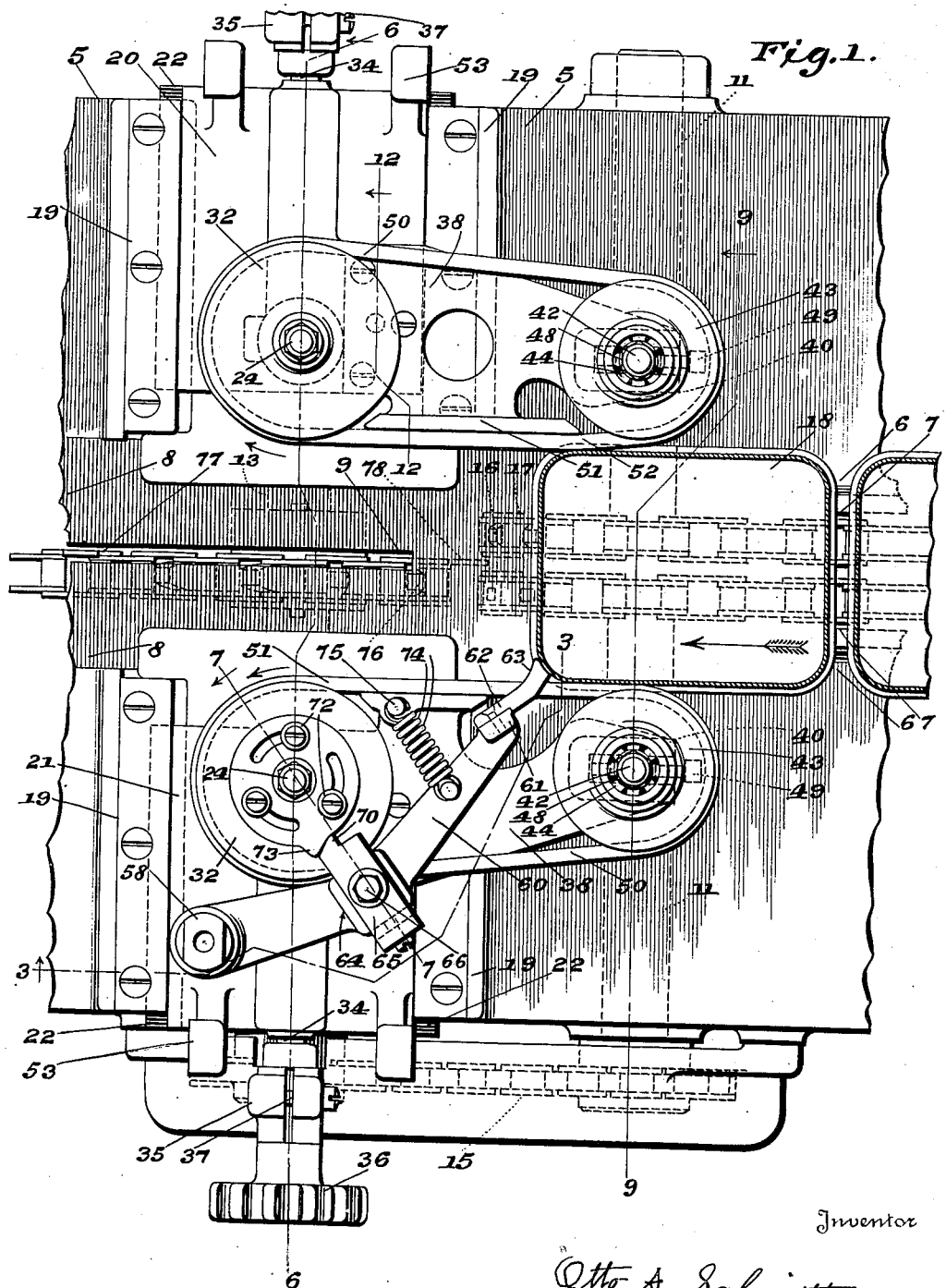
Figure 1 is a plan view illustrating the invention.

In the example of embodiment of the invention herein illustrated, there is included a suitable framing structure generally designated 5 on which are provided can conveyor ways 6 which are slotted and spaced, as at 7, to provide conveyor chain clearance, and which also supports conveyor ways or plate equipment 8 which is slotted, as at 9, to provide a feed-in chain lug clearance.

The framing is equipped with a pair of depending, transversely aligned bearings 10 for rotatably supporting a cross shaft 11, and a second pair of depending, transversely aligned bearings 12 for rotatably supporting a cross shaft 13. The shafts 11 and 13 have sprockets 14 of like diameter fixed thereon, and a chain 15 takes over these sprockets and causes the shafts to rotate in unison. See Figures 1, 6 and 9.

Two sprockets 16 are keyed to the shaft 11, and block chains 17 pass about these sprockets and constitute a conveyor for feeding can bodies 18 at random toward the machine being served by the feed timing mechanism so that the cans will be intercepted in end abutting relation and in a line by the interceptor finger to be described hereinafter. See Figures 1 and 9.

Above the shaft 13, the framing is provided with two sets of transversely aligned slideways 19. In one of the slideways, a slide generally designated 20 is mounted, and a similar slide generally designated 21 is mounted in the other of the slideways. Each of the slides is equipped with machined edge flanges 22 slidable in the guides 19, and each slide also includes a vertically disposed bearing 23 for a rotary shaft 24. Each shaft 24 carries a bevel pinion 25 at its lower end, and each pinion meshes with a pinion gear 26 carried by a sleeve 27 which is splined on the shaft 13 as at 28. Each sleeve 27 includes a collar 29 having an annular groove 30 therein, and a forked member 31 depending from the respective slide 20 or 21 straddles the sleeve within the groove 30 so as to constantly maintain the intermeshing relation of the pinions 25 and gears 26 regardless of the positions of the slides. A grooved pulley 32 is fixed to the upper end of each shaft 24. See Figure 6.

Each slide 20, 21 also includes a depending boss 33 having a threaded bore therein for receiving an adjuster screw 34 held captive in a clamp bearing 35 extending upwardly and outwardly from the respective side of the framing 5 in the manner best illustrated in Figures 1 and 6 of the drawings. Each screw has a hand wheel 36 affixed to the outer end thereof, and it will be obvious that by rotating these hand wheels the slides 20 and 21 can be moved toward or from each other for varying the spacing of the pulleys 32. The adjustments of the slides can be secured by tightening the clamp screws 36 with which the clamp bearings 35 are equipped.

Each slide 20, 21 also has a bracket 38 removably secured thereto, as at 39, the brackets being longitudinally extended from the slides and each equipped with a bearing fork 40. See Figures 1 and 10 of the drawings. Each bearing fork 40 is adapted to adjustably receive the head block 41 formed at the lower end of a vertically disposed idler pulley mounting shaft or spindle 42, and each spindle serves as a support for a grooved idler pulley 43. The idler pulleys 43 are rotatable about anti-friction bearings 44 on the respective spindles, and it will be noted by reference to Figure 9 of the drawings that a spacer sleeve 45 is interposed between the upper and lower bearings of each set, and that a base washer 46 is disposed above the spindle head block 41 and beneath the lowermost one of said bearings. An abutment head 47 carried by each spindle opposes the under surface of the respective fork 40, and a clamp nut 48 secures the assembled relation of the respective idler pulley 43 and the associated spindle and anti-friction bearings. An adjuster screw 49 threaded through each head block 41 may be utilized to adjust the position of the respective spindle 42 within the fork 40. See Figures 1, 9 and 11 of the drawings.

Two V-belts 50 pass about each set of pulleys 32, 43, and each bracket 38 includes an upstanding wall portion 51 which forms a backing for the opposed, effective flights of the belts 50 in the manner clearly illustrated in Figures 1, 2 and 12 of the drawings. It will also be noted by reference to Figures 1 and 2 of the drawings that the wall portion 51 carried by the slide 20 extends longitudinally and inwardly a greater distance than does the opposite wall portion, thereby to slightly offset the belts 50 backed thereby in the manner indicated at 52, thereby to determine the point at which the can bodies are first effectively engaged by the opposing belt equipments 50 carried by the respective slides 20, 21.

Each slide 20, 21 is equipped with a pair of upwardly and outwardly extended lugs or ears 53 which are bored to receive a hinge pintle 54. Each hinge pintle serves to hingedly mount a cover 55 for housing the pulley and belt equipment 32, 43, 50 at the respective side of the mechanism, and each cover is cut away at its inner face, as at 56, so as to expose the effective or can body engaging portions of the belts 50. See Figures 1, 6 and 10 of the drawings.

The slide 21 is equipped with a bearing boss 57 in which a bearing stud 58 is vertically disposed and secured, as at 59. See Figures 1, 2, 3 and 10. The stud 58 forms a pivotal mounting for an interceptor or stop lever 60 which is equipped at its free end with a mounting pad 61 to which the interceptor or stop finger 62 is removably secured. The finger 62 is forked, as at 63, so as to straddle the adjacent belts 50 in the manner clearly illustrated in Figures 1, 2, 3 and 4 of the drawings.

The lever 60 is equipped intermediately of its ends with a cross groove 64 in which an inverted U-shaped tappet member 65 is mounted. The tappet member is secured in place by a clamping screw 66 which passes through a longitudinal slot 67 formed in the member 65 and into a threaded receiving bore in the lever 60. One leg of the inverted U-shaped tappet member 65 is notched, as at 68, to straddle an adjuster screw 69 which may be utilized in effecting and securing adjustments of the position of the tappet member 65. See Figures 1, 5 and 7 of the drawings.

It will be noted that the tappet member 65 is equipped with a cam nose portion 70 which is opposed to the periphery of a cam plate 71 adjustably secured, as at 72, on the top of the grooved pulley 32 carried by the slide 21. The cam plate 71 is equipped with a cam nose 73 engageable with the tappet member nose portion 70 once in each revolution of the cam plate, thereby to displace the interceptor or stop finger 62 from its effective, can line stopping position as illustrated in Figure 2. A retractile spring 74 connected to the free end of the stop lever 60 and anchored, as at 75, to the adjacent bracket 38 constantly urges the lever 60 toward the cam 71 and yieldably holds the interceptor finger 62 against the side of each traveling can body 18 just after it has been released and is being forwardly fed by the belts 50 in the manner illustrated in Figure 2.

A single sprocket 76 is fixed to the shaft 13, and a conveyor chain 77 passes around this sprocket and is equipped with suitably spaced feeder lugs 78 for engaging individual can bodies and feeding them in properly timed relation to the machine being served by the mechanism hereinbefore described.

In the operation of the can body feed timing mechanism, the line of can bodies 18 being moved by the block chains 17 toward the machine in which work is to be performed on said can bodies, is intercepted and held stationary by the interceptor or stop finger 62 in the manner illustrated in Figure 1 of the drawings. Each time the cam nose 73 engages the tappet member nose portion 70 in the manner illustrated in Figure 2, the interceptor or stop finger 62 is displaced and the first can body in the line is gripped between the displaced portion 52 of the belt equipment 50 shown at the top in Figure 2 and the opposing portion of the other belt equipment and is rapidly advanced into position for being engaged by the next advancing feeder lugs 78 on the conveyor chain 77 to be fed thereby into the machine in properly timed and spaced relation. Just as soon as the leading can body is thus released and its forward movement is commenced, the finger 62 is released by the rotating cam nose 73 and the spring 74 will hold the finger pressed against the side of the can body as it is moved along by the V-belts 50. The finger 62 will slide off the can body as the end thereof passes and it will engage the advance end of the next can body in the line in the manner illustrated in Figure 1 of the drawings, thus again intercepting and stopping forward movement of the line of cans on the block chains 17. This operation is repeated and it will be obvious that by reason of the yieldable sliding engagement of the interceptor or stop finger 62 with the can bodies 18, this control finger will operate to time the feeding of can bodies of any length without in anywise changing the timing gear.

It will also be apparent that by adjusting the spaced relation of the slides, the space between the effective flights of the belts 50 can be altered at will so that the mechanism is also adaptable for the feeding of can bodies of various widths as well as of various lengths.

It is of course to be understood that the details of structure and arrangement of parts may be variously changed and modified without departing from the spirit and scope of the invention.

I claim:

1. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, and means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line.

2. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, and means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, and means for varying the spaced relation of said belts to accommodate can bodies of various widths.

3. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, and means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, said finger having a forked can body engaging end portion disposed to straddle one of said belts.

4. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, and hand screw means for adjusting the spaced relation of the slides so as to vary the belt spacing for accommodating can bodies of various widths.

5. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, two laterally adjustably mounted supporting members each carrying one belt and its supporting pulleys the spaced relation of which can be varied to vary the belt spacing for accommodating can bodies of various widths, and means supporting the stop finger on one said supporting member for movement of adjustment therewith.

6. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, two laterally adjustably mounted supporting members each carrying one belt and its supporting pulleys the spaced relation of which can be varied to vary the belt spacing for accommodating can bodies of various widths, said finger displacing means including a rotary cam having a displacing nose engageable with said finger, spring means constantly urging the finger toward said cam, and means supporting said stop finger, said cam and said spring on one said supporting member for movement of adjustment therewith.

7. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, means for securing positions of adjustment of said slides, and a wall portion on each slide forming a backing wall for the can body engaging flight of the belt thereon.

8. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, means for securing positions of adjustment of said slides, and a wall portion on each slide forming a backing wall for the can body engaging flight of the belt thereon, one said wall portion being disposed for displacing a part of the effective flight of the engaging belt inwardly toward the opposite belt.

9. In can body feed timing mechanism, a straight line conveyor for feeding a straight line of rectangular can bodies having rounded corners in abutting relation toward a receiving machine, a second straight line conveyor aligned with the first mentioned conveyor and adapted for feeding individual can bodies in spaced relation toward said machine, a stop finger yieldably urged into the path of travel of the line of can bodies on the first mentioned conveyor for intercepting and preventing movement thereof, means for intermittently and only momentarily displacing and then releasing said finger to successively free the foremost can presented in the line and permit it to move to the second conveyor, the finger upon its release yieldably engaging and sliding along at least a portion of the length at one flat side of said foremost can body and off the end thereof into intercepting contact with the next can body in the line, separate shaft and sprocket equipments about which said conveyors pass, and power transmitting connections between said separate shafts for causing them to rotate in unison.

10. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, hand screw means for adjusting the spaced relation of the slides so as to vary the belt spacing for accommodating can bodies of various widths, a power shaft beneath said slides, power transmitting connections between each driver pulley and said shaft and including a driver sleeve splined on said power shaft, and means on each said slide and engaging the underlying sleeve for causing it to partake of movements of adjustment with said slide.

11. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, hand screw means for adjusting the spaced relation of the slides so as to vary the belt spacing for accommodating can bodies of various widths, means pivotally mounting said finger on one said slide, said finger displacing means comprising a cam mounted for rotation with the driver pulley on said one slide and having a displacing nose engageable with said finger, and spring means on said one slide constantly urging the finger into position determining engagement with said cam.

12. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, hand screw means for adjusting the spaced relation of the slides so as to vary the belt spacing for accommodating can bodies of various widths, means pivotally mounting said finger on one said slide, said finger displacing means comprising a cam mounted for rotation with the driver pulley on said one slide and having a displacing nose engageable with said finger, spring means on said one slide constantly urging the finger into position determining engagement with said cam, a power shaft beneath said slides, power transmitting connections between each driver pulley and said shaft and including a driver sleeve splined on said power shaft, and means on each said slide and engaging the underlying sleeve for causing it to partake of movements of adjustment with said slide.

13. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, hand screw means for adjusting the spaced relation of the slides so as to vary the belt spacing for accommodating can bodies of various widths, means pivotally mounting said finger on one said slide, said finger displacing means comprising a cam mounted for rotation with the driver pulley on said one slide and having a displacing nose engageable with said finger, spring means on said one slide constantly urging the finger into position determining engagement with said cam, a power shaft beneath said slides, power transmitting connections between each driver pulley and said shaft and including a driver sleeve splined on said power shaft, means on each said slide and engaging the underlying sleeve for causing it to partake of movements of adjustment with said slide, and a wall portion on each slide forming a backing wall for the can body engaging flight of the belt thereon, one said wall portion being disposed for displacing a part of the effective flight of the engaging belt inwardly toward the opposite belt.

14. In can body feed timing mechanism, a conveyor for feeding a line of can bodies in abutting relation toward a receiving machine, a second conveyor for feeding individual can bodies in spaced relation toward said machine, opposed endless belts having feeder flights disposed in generally parallel relation and spaced apart a distance corresponding to the width of the can bodies being fed, said belts serving to feed can bodies one by one from the first mentioned conveyor to said second conveyor, a stop finger yieldably urged into the path of travel of the line of can bodies for intercepting and preventing movement thereof, means for intermittently and momentarily displacing said finger to successively free the foremost can presented in the line and permit it to be moved along by said belts with the finger yieldably engaging and sliding along at least a portion of the length of said foremost can body and off the end thereof into intercepting contact with the next can body in the line, a driver pulley and an idler pulley supporting each said belt, transversely slidable and aligned slides each carrying one belt and its supporting pulleys, hand screw means for adjusting the spaced relation of the slides so as to vary the belt spacing for accommodating can bodies of various widths, means pivotally mounting said finger on one said slide, said finger displacing means comprising a cam mounted for rotation with the driver pulley on said one slide and having a displacing nose engageable with said finger, spring means on said one slide constantly urging the finger into position determining engagement with said cam, a power shaft beneath said slides, power transmitting connections between each driver pulley and said shaft and including a driver sleeve splined on said power shaft, means on each said slide and engaging the underlying sleeve for causing it to partake of movements of adjustment with said slide, and a wall portion on each slide forming a backing wall for the can body engaging flight of the belt thereon, one said wall portion being disposed for displacing a part of the effective flight of the engaging belt inwardly toward the opposite belt, said finger having a forked cam body engaging end portion disposed to straddle the belt directly opposite the inwardly displaced part of the opposing belt.

OTTO A. SCHMITT.